(12) United States Patent
Sodagar et al.

(10) Patent No.: US 11,496,414 B2
(45) Date of Patent: Nov. 8, 2022

(54) INTEROPERABLE CLOUD BASED MEDIA PROCESSING USING DYNAMIC NETWORK INTERFACE

(71) Applicant: TENCENT AMERICA LLC, Palo Alto, CA (US)

(72) Inventors: Iraj Sodagar, Los Angeles, CA (US); Shuai Zhao, Pleasanton, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 16/821,015

(22) Filed: Mar. 17, 2020

(65) Prior Publication Data

US 2020/0304423 A1  Sep. 24, 2020

Related U.S. Application Data

(60) Provisional application No. 62/820,192, filed on Mar. 18, 2019.

(51) Int. Cl.
| | |
|---|---|
| *H04L 29/08* | (2006.01) |
| *H04L 47/70* | (2022.01) |
| *H04L 43/08* | (2022.01) |
| *H04L 67/10* | (2022.01) |
| *H04L 65/80* | (2022.01) |
| *H04L 41/5003* | (2022.01) |
| *H04L 67/51* | (2022.01) |

(52) U.S. Cl.
CPC ........ *H04L 47/827* (2013.01); *H04L 41/5003* (2013.01); *H04L 43/08* (2013.01); *H04L 65/80* (2013.01); *H04L 67/10* (2013.01); *H04L 67/51* (2022.05)

(58) Field of Classification Search
CPC ..................................................... H04L 47/827
See application file for complete search history.

(56) References Cited

U.S. PATENT DOCUMENTS

| | | |
|---|---|---|
| 2014/0006474 A1 | 1/2014 | White et al. |
| 2016/0036886 A1 | 2/2016 | Ito |
| 2019/0028691 A1* | 1/2019 | Hinds ................ H04N 21/4518 |

OTHER PUBLICATIONS

International Search Report dated Jun. 17, 2020 in International Application No. PCT/US2020/023246.
Written Opinion of the International Searching Authority dated Jun. 17, 2020 in International Application No. PCT/US2020/023246.

* cited by examiner

*Primary Examiner* — Adnan M Mirza
(74) *Attorney, Agent, or Firm* — Sughrue Mion, PLLC

(57) ABSTRACT

A method of processing media content in Moving Picture Experts Group (MPEG) Network Based Media Processing (NBMP) includes obtaining a plurality of tasks for processing the media content, providing an interface between an NBMP workflow manager and a cloud manager by providing an NBMP Link application program interface (API), which links the plurality of tasks together, identifying an amount of network resources to be used for processing the media content, by using the NBMP Link API, and processing the media content in accordance with the identified amount of network resources.

17 Claims, 6 Drawing Sheets

INTEROPERABLE CLOUD BASED MEDIA PROCESSING USING DYNAMIC NETWORK INTERFACE

CROSS-REFERENCE TO RELATED APPLICATION

This application claims priority from U.S. Provisional Patent Application No. 62/820,192, filed on Mar. 18, 2019, in the U.S. Patent and Trademark Office, the disclosure of which is incorporated herein by reference in its entirety.

BACKGROUND

The Moving Picture Experts Group (MPEG) Network Based Media Processing (NBMP) project has developed a concept of processing media on cloud. However, current NBMP design does not provide an application program interface (API) abstraction for network management. Current NBMP design only provides APIs for cloud resources such as a hardware platform. Further, the current NBMP workflow manager works like a job distributor only, such as a Hadoop master node, which takes the job and distributes the job to all worker nodes based on the pre-defined the computing configurations. The workflow manager can obtain workers computing resources information such as using SNMP (Simple Network management protocol). However, there is a problem in that it is difficult to obtain the networking resources among the links, such as network topology, bandwidth, latency, and QoS and others.

SUMMARY

According to embodiments, a method of processing media content in Moving Picture Experts Group (MPEG) Network Based Media Processing (NBMP) is performed by at least one processor, and includes obtaining a plurality of tasks for processing the media content, providing an interface between an NBMP workflow manager and a cloud manager by providing an NBMP Link application program interface (API), which links the plurality of tasks together, identifying an amount of network resources to be used for processing the media content, by using the NBMP Link API, and processing the media content in accordance with the identified amount of network resources.

According to embodiments, an apparatus for processing media content in Moving Picture Experts Group (MPEG) Network Based Media Processing (NBMP) includes at least one memory configured to store program code, and at least one processor configured to read the program code and operate as instructed by the program code, the program code including obtaining code configured to cause the at least one processor to obtain a plurality of tasks for processing the media content, providing code configured to cause the at least one processor to provide an interface between an NBMP workflow manager and a cloud manager by providing an NBMP Link application program interface (API), which links the plurality of tasks together, identifying code configured to cause the at least one processor to identify an amount of network resources to be used for processing the media content, by using the NBMP Link API, and processing code configured to cause the at least one processor to process the media content in accordance with the identified amount of network resources.

According to embodiments, a non-transitory computer-readable medium stores instructions that, when executed by at least one processor of an apparatus for processing media content in Moving Picture Experts Group (MPEG) Network Based Media Processing (NBMP), cause the at least one processor to obtaining code configured to cause the at least one processor to obtain a plurality of tasks for processing the media content, providing code configured to cause the at least one processor to provide an interface between an NBMP workflow manager and a cloud manager by providing an NBMP Link application program interface (API), which links the plurality of tasks together, identifying code configured to cause the at least one processor to identify an amount of network resources to be used for processing the media content, by using the NBMP Link API, and processing code configured to cause the at least one processor to process the media content in accordance with the identified amount of network resources.

DETAILED DESCRIPTION

Embodiments described herein provide functional improvements to the MPEG NBMP standard. Such improvements increase media processing efficiency, increase speed and lower cost of deployment of media services, and allow large scale deployment of media services by leveraging public, private or hybrid cloud services.

In examples, the functional improvements to the MPEG NBMP standard include allowing the NBMP source be a user local input, cloud-local input, or a cloud remote input. This adds flexibility in terms of deploying services for local applications, cloud based application or application that are run remotely on clouds. Also, a single interface may be defined between NBMP workflow manager and cloud manager. Therefore, it makes operations of the media session through the cloud manager and network controller. Since the cloud manager has the ultimate knowledge about the cloud, it may simplify the operations and make them more feasible for NBMP workflow manager.

Further, functional improvements to the MPEG NBMP standard include allowing the workflow manager to have adequate information regarding networking and physical computing resources. The NBMP has an API to the cloud resource and network manager. This API allows NBMP workflow manager to communicate with the cloud service for configuring the media services, for setting up the session, for allocation of computing and network resources, without having any knowledge of the cloud platform. The cloud manager translates the requests and information provided from and to the NBMP workflow manager to the internal cloud platform interfaces. Furthermore, the NBMP workflow manager can manage, monitor and analyze the performance of the media session, through this standard API and without knowing the internal cloud platform logics. Network management requirement is also included.

Further, functional improvements to the MPEG NBMP standard include adding a Function discovery API to the API between the NBMP workflow manager and the cloud manager. This makes it possible for the workflow manager to discover preferred optimized implementation of functions on cloud and use them rather than loading the generic implementation of them on the cloud.

Figure 1:
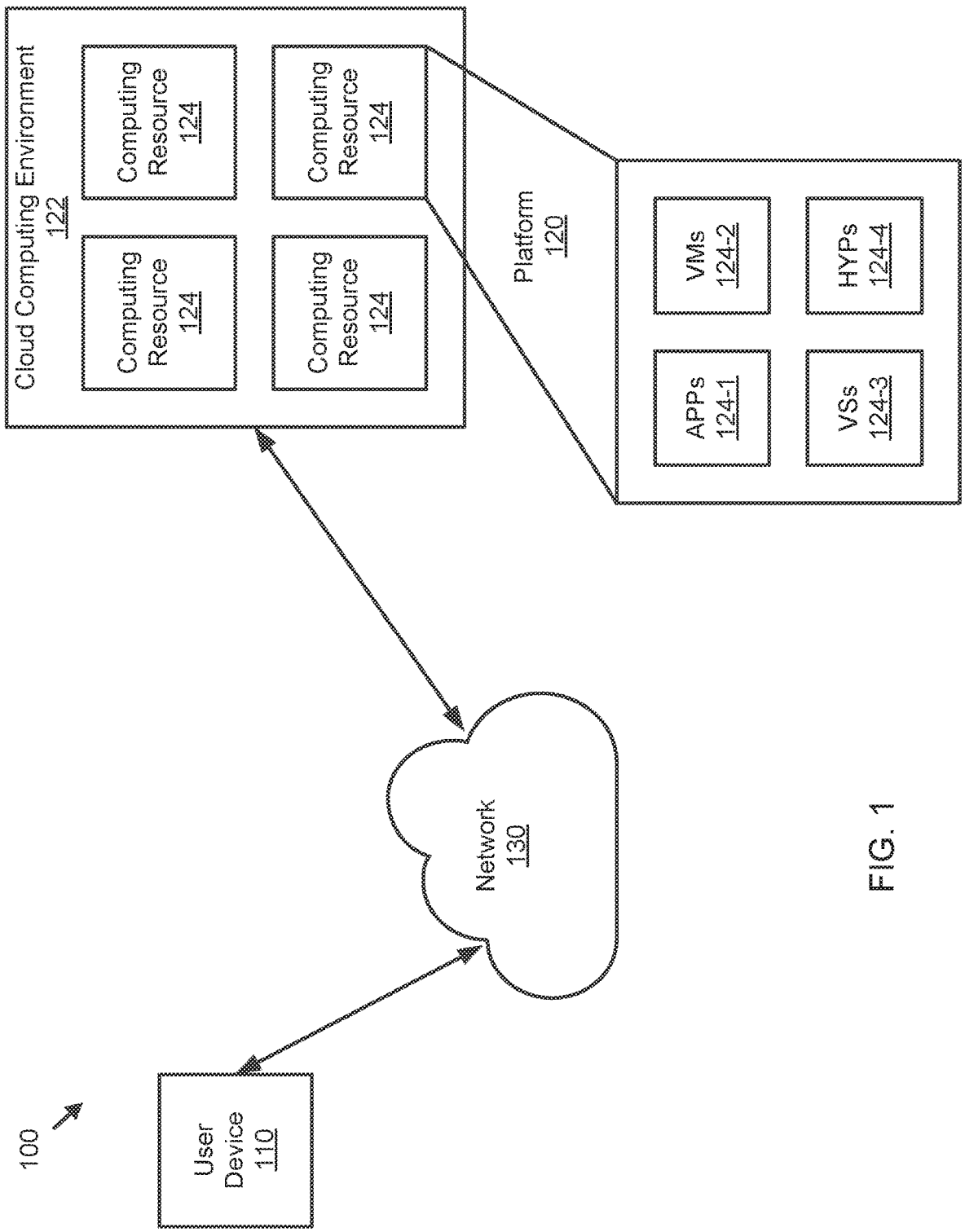
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
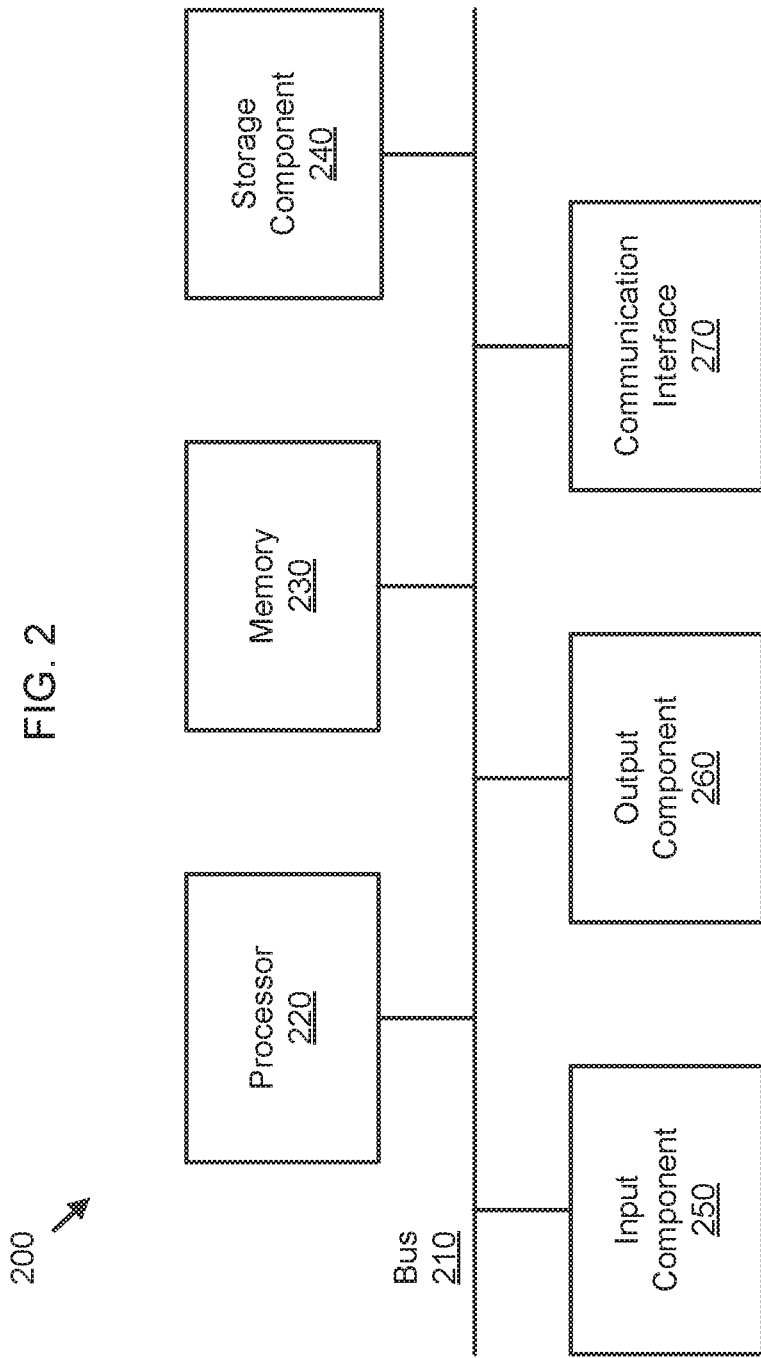
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3A:
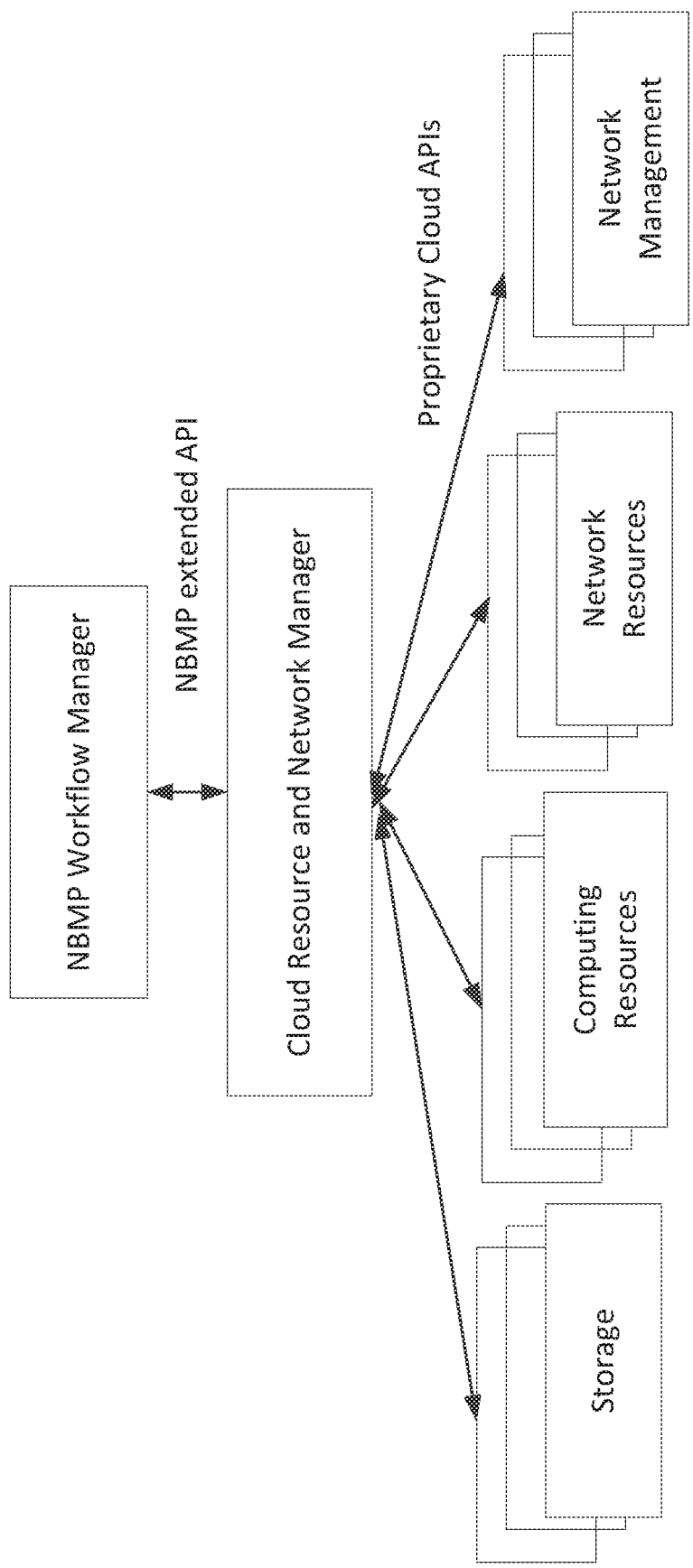
FIG. 3A is a block diagram of an NBMP system, according to embodiments.

FIG. 3A is a block diagram of an NBMP system, according to embodiments.

FIG. 3A illustrates an interface between NBMP workflow manager and Cloud manager. The cloud manager can translate a request to internal API, and communicate them to different hardware modules.

According to embodiments, an abstracted architecture is defined that puts the Cloud Resource and Network Manager in the middle of NBMP reference architecture and extends NBMP APIs to be the interface between NBMP Workflow Manager and Cloud Resource and Network Manager.

Figure 3B:
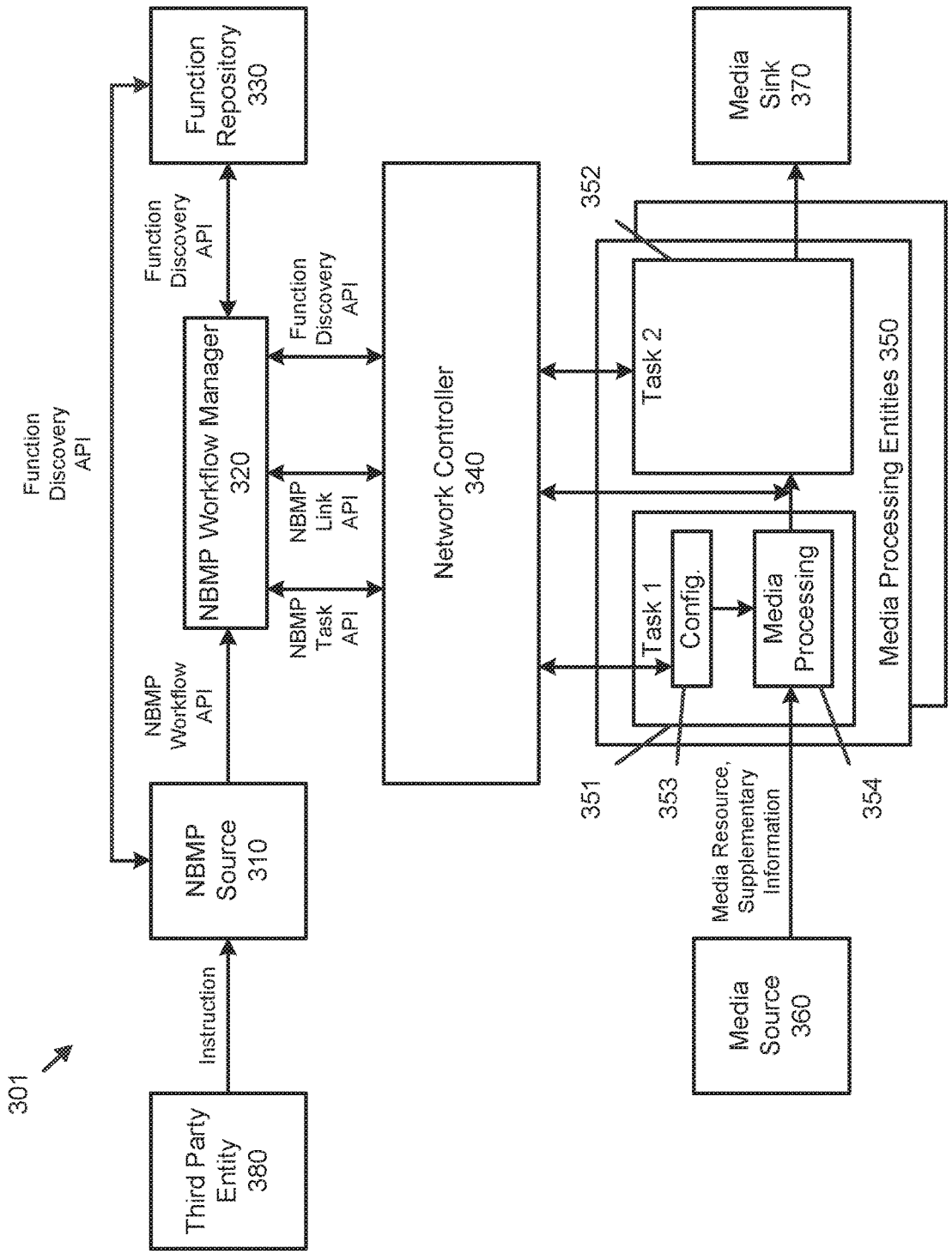
FIG. 3B is a block diagram of an NBMP system, according to embodiments.

FIG. 3B is a block diagram of an NBMP system 301, according to embodiments.

Referring to FIG. 3B, the NBMP system 301 includes an NBMP source 310, an NBMP workflow manager 320, a function repository 330, a network controller 340, one or more media processing entities 350, a media source 360, and a media sink 370.

The NBMP source 310 may receive instructions from a third party entity 380, may communicate with the NBMP workflow manager 320 via an NBMP workflow API, and may communicate with the function repository 330 via a function discovery API. For example, the NBMP source 310 may send a workflow description document to the NBMP workflow manager 320, and may read a function description of functions that are stored in a memory of the function repository 330. The functions may include media processing functions such as, for example, functions of media decoding, feature point extraction, camera parameter extraction, projection method, seam information extraction, blending, post-processing, and encoding. The NBMP source 310 may include at least one processor and a memory that stores code configured to cause the at least processor to perform functions of the NBMP source 310.

The NBMP source 310 may request the NBMP workflow manager 320 to create workflow including tasks 351 and 352 to be performed by the one or more media processing entities 350, by sending the workflow description document to the NBMP workflow manager 320. The workflow description document may include descriptors, each of which may include parameters.

For example, the NBMP source 310 may select one or more of the functions stored in the function repository 330, and send, to the NBMP workflow manager 320, the workflow description document including the descriptors for describing details such as input and output data, the selected one or more of the functions, and requirements for a workflow. The workflow description document may further include a set of task descriptions and a connection map of inputs and outputs of the tasks 351 and 352 to be performed by the one or more of the media processing entities 350. When the NBMP workflow manager 320 receives such information from the NBMP source 310, the NBMP workflow manager 320 may create the workflow by instantiating the tasks 351 and 352 based on function names and connecting the tasks 351 and 352 in accordance with the connection map.

Alternatively or additionally, the NBMP source 310 may request the NBMP workflow manager 320 to create a workflow by using a set of keywords. For example, the NBMP source 310 may send, to the NBMP workflow manager 320, the workflow description document including the set of the keywords that the NBMP workflow manager 320 may use to find appropriate one or more of the functions stored in the function repository 330. When the NBMP workflow manager 320 receives such information from the NBMP source 310, the NBMP workflow manager 320 may create the workflow by searching for the appropriate one or more of the functions, using the keywords that may be specified in a Processing Descriptor of the workflow description document, and by using other descriptors in the workflow description document to provision and connect the tasks 351 and 352.

The NBMP workflow manager 320 may communicate with the function repository 330 via a function discovery API, and may communicate with one or more of the media processing entities 350, through the network controller 340, via an NBMP task API, an NBMP link API, and a function discovery API. The NBMP workflow manager 320 may include at least one processor and a memory that stores code configured to cause the at least processor to perform functions of the NBMP workflow manager 320.

The NBMP Link API is added to the NBMP original architecture. As illustrated in FIG. 3B, any link between two tasks also has an API similar to the Task's API. Using this Link's API, the NBMP workflow manager can set up the required network resources, as well as monitor the status of the link during the media session or receive reports from the link. This API should be implemented by Cloud platform. For every link, this API is set up and the Cloud platform instantiates one instance of it using its network controllers, cloud manager or virtual networking managers.

The NBMP function discovery API is also added to the NBMP original architecture. This API enables NBMP to discover the pre-loaded functions on cloud and use them rather than loading them again.

The NBMP workflow manager 320 may use the NBMP task API to setup, configure, manage, and monitor one or more of the tasks 351 and 352 of the workflow that is performable by the one or more media processing entities 350. In embodiments, the NBMP workflow manager 320 may use the NBMP task API to update and destroy the tasks 351 and 352. To configure, manage, and monitor the tasks 351 and 352 of the workflow, the NBMP workflow manager 320 may send messages, such as requests, to one or more of the media processing entities 350, wherein each message may have descriptors, each of which may include parameters. The tasks 351 and 352 may each include one or more media processing functions 354 and one or more configurations 353 for the one or more media processing functions 354.

In embodiments, after receiving the workflow description document from the NBMP source 310 that does not include a list of tasks (e.g., includes a list of keywords instead of a list of tasks), the NBMP workflow manager 320 may select the tasks based on descriptions of the tasks in the workflow description document, to search the function repository 330, via the function discovery API, to find appropriate one or more of the functions to run as the tasks 351 and 352 for the current workflow. For example, the NBMP workflow manager 320 may select the tasks based on keywords that are provided in the workflow description document. After the appropriate one or more of the functions are identified using the keywords or the set of task descriptions that is provided by the NBMP source 310, the NBMP workflow manager 320 may configure the selected tasks in the workflow by using the NBMP task API. For example, the NBMP workflow manager 320 may extract configuration data from information that is received from the NBMP source, and configure the tasks 351 and 352 based on the extracted configuration data.

The one or more media processing entities 350 may be configured to receive media content from the media source 360, process the received media content in accordance with the workflow that includes the tasks 351 and 352 and is created by the NBMP workflow manager 320, and output the processed media content to the media sink 370. The one or more media processing entities 350 may each include at least one processor and a memory that stores code configured to cause the at least processor to perform functions of the one or more media processing entities 350.

The network controller 340 may include at least one processor and a memory that stores code configured to cause the at least processor to perform functions of the network controller 340.

The media source 360 may include memory that stores media and may be integrated with or separate from the NBMP source 310. In embodiments, the NBMP workflow manager 320 may notify the NBMP source 310 and/or the media source 360 when a workflow is prepared, and the media source 360 may transmit media content to the one or more of the media processing entities 350 based on a notification that the workflow is prepared.

The media sink 370 may include at least one processor and at least one display that is configured to display media content that is processed by the one or more media processing entities 350.

The third party entity 380 may include at least one processor and a memory that stores code configured to cause the at least processor to perform functions of the third party entity 380.

As discussed above, messages from the NBMP source 310 (e.g., a workflow description document for requesting creation of a workflow) to the NBMP workflow manager 320, and messages (e.g., for causing the workflow to be performed) from the NBMP workflow manager 320 to the one or more media processing entities 350 may include descriptors, each of which including parameters. In embodiments, communication between any of components of the NBMP system 301 using an API may include descriptors, each of which including parameters.

Extending the Requirement Descriptor

According to embodiments, in order to setup and monitor the networking between two tasks, NBMP QoS Requirements objects are extended with the parameters shown in Table 1 below.

TABLE 1

QoS Requirements extension

| Parameter Name | Description | Data Type |
| --- | --- | --- |
| minDelay | The minimum delay of this networking element in microseconds. | Unsigned Integer |
| MaxDelay | The maximum delay of this networking element in microseconds. | Unsigned Integer |
| minThroughput | The minimum bandwidth of this networking element in bits. | Unsigned Integer |
| MaxThroughput | The maximum bandwidth of this networking element in bits. | Unsigned Integer |
| Averaging Window | The averaging window used to calculate the bandwidth in milliseconds. The default is one second. | Unsigned Integer |

Link Resource API

According to embodiments, the link is similar to Task and can use the simplified Task Resource API. A link resource API may be added or Task Resource API may be extended to support the networking. Link API operations.

According to embodiments, the link API operation would be similar to Task API operation and same configuration API can be used.

Discovery of Preloaded Functions in Cloud

According to embodiments, NBMP functions may have been preloaded in a cloud service. Some of the functions may be implemented by the cloud platform or a $3^{rd}$ party vendor may have an optimized implementation of its function for a specific cloud solution.

According to embodiments, the location of a function's implementation may be identified with a uniform resource locator (URL) in the function's processing descriptor. Before NBMP workflow manager loads that implementation to the cloud, it may make an inquiry if a preferred implementation of this function exists in the cloud platform; and if this is the case, the NBMP workflow manager can use that specific implementation of the function. This may require that a function from same vendor has a unique ID, and that each implementation of the function has a unique ID.

According to embodiments, a workflow creation of an NBMP process includes:

1. An NBMP Source uses the Workflow API to create a workflow. It sends the workflow description document as part of the request. The workflow manager checks the workflow description document and starts building the workflow.
2. The workflow manager sends a query or set of queries to the Function Registry to find the Functions that it will deploy to create the workflow.
3. For each query, the Function Registry replies with a short list of potential Functions, their descriptions and their configuration information.
4. The workflow manager selects the set of Functions it wants to deploy and based on their requirements it contacts the cloud platform to create the required Media Processing Entities and load the Functions on them.
    a. For each Function, the workflow manager makes an inquiry to find out if a preferred implementation of that Function is already supported by the platform. If such implementation exists, the cloud platform returns a new ID for the Function.
        i. For existing preferred Functions, the workflow manager uses their ID for creating the tasks.
        ii. For non-existing functions, the workflow manager provides an authorized URL to the cloud manager to download the function's implementation.
5. The cloud platform confirms the creation of each Media Processing Entity, including the network access information.
6. The workflow manager creates a configuration for each Task and uses the Task API to send the configuration to that Task.
7. The Task confirms the successful configuration and returns access information so the workflow manager can connect the next Task.
8. The workflow manager confirms the creation of the workflow to the NBMP Source and informs it that media processing can start.

Thus, according to embodiments, a function discovery API may be used between workflow manager and cloud manager. This API may use the existing function's general and processing descriptors to make inquiry and get a response on the existence of a function on the cloud platform.

Figure 4:
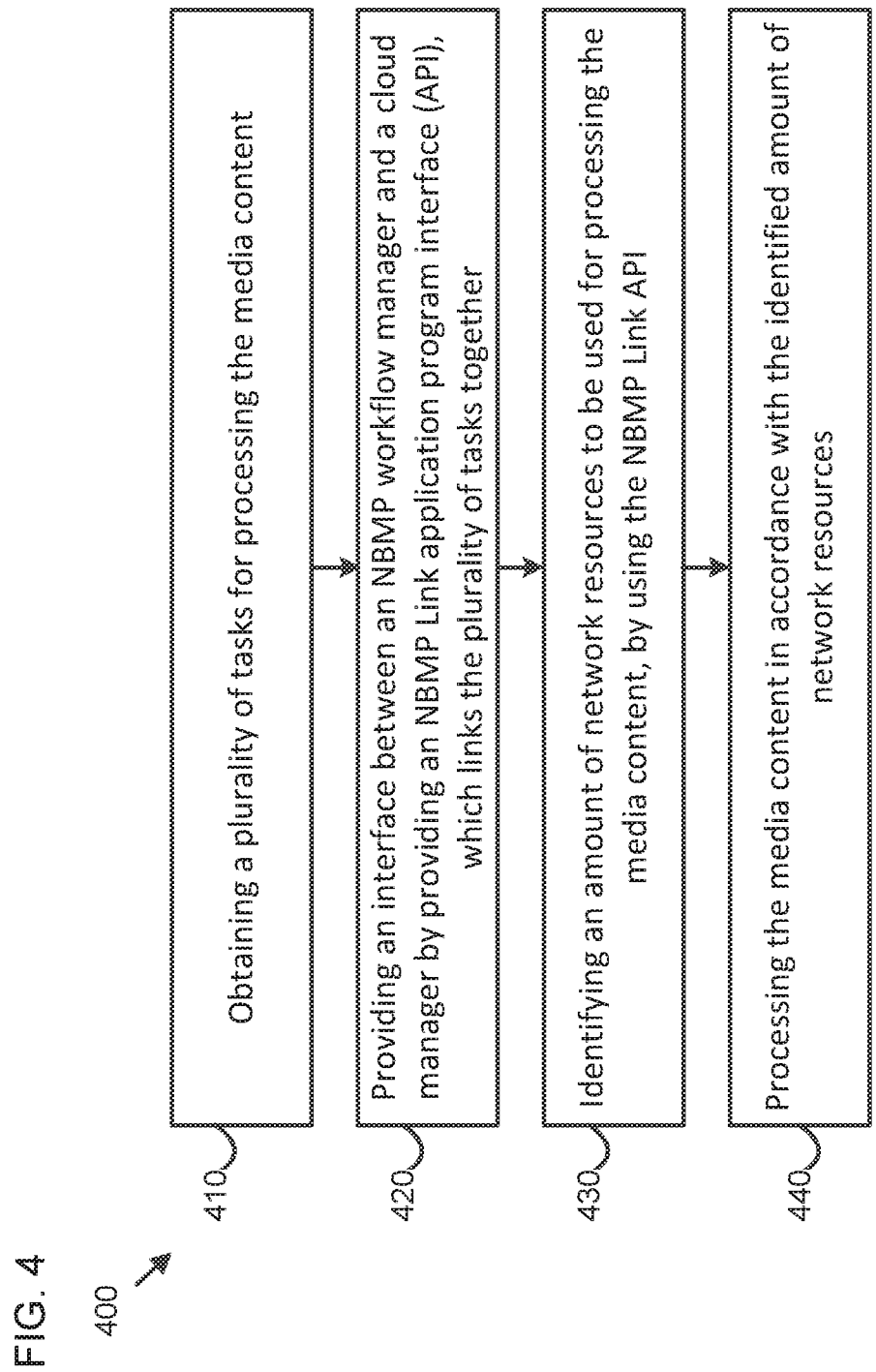
FIG. 4 is a flowchart of a method of processing media content in MPEG NBMP, according to embodiments.

FIG. 4 is a flowchart of a method 400 of processing media content in MPEG NBMP, according to embodiments. In some implementations, one or more process blocks of FIG. 4 may be performed by the platform 120 implementing the NBMP system 301. In some implementations, one or more process blocks of FIG. 4 may be performed by another device or a group of devices separate from or including the platform 120 implementing the NBMP system 301, such as the user device 110.

As shown in FIG. 4, in operation 410, the method 400 includes obtaining a plurality of tasks for processing the media content.

In operation 420, the method 400 includes providing an interface between an NBMP workflow manager and a cloud manager by providing an NBMP Link application program interface (API), which links the plurality of tasks together.

In operation 430, the method 400 includes identifying an amount of network resources to be used for processing the media content, by using the NBMP Link API.

In operation 440, the method 400 includes processing the media content in accordance with the identified amount of network resources.

The method may further include monitoring a communication between the linked plurality of tasks by extending NBMP Quality of Service (QoS) requirements according to at least one parameter. The at least one parameter comprises at least one from among minDelay, maxDelay, minThroughput, maxThroughput, and averagingWindow.

The identifying the amount of network resources may include monitoring a status of the NBMP Link API during a media session.

The identifying the amount of network resources may include receiving a report from the NBMP Link API. The function discovery API may include discovering pre-loaded functions to use for processing the media content.

Although FIG. 4 shows example blocks of the method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel.

Figure 5:
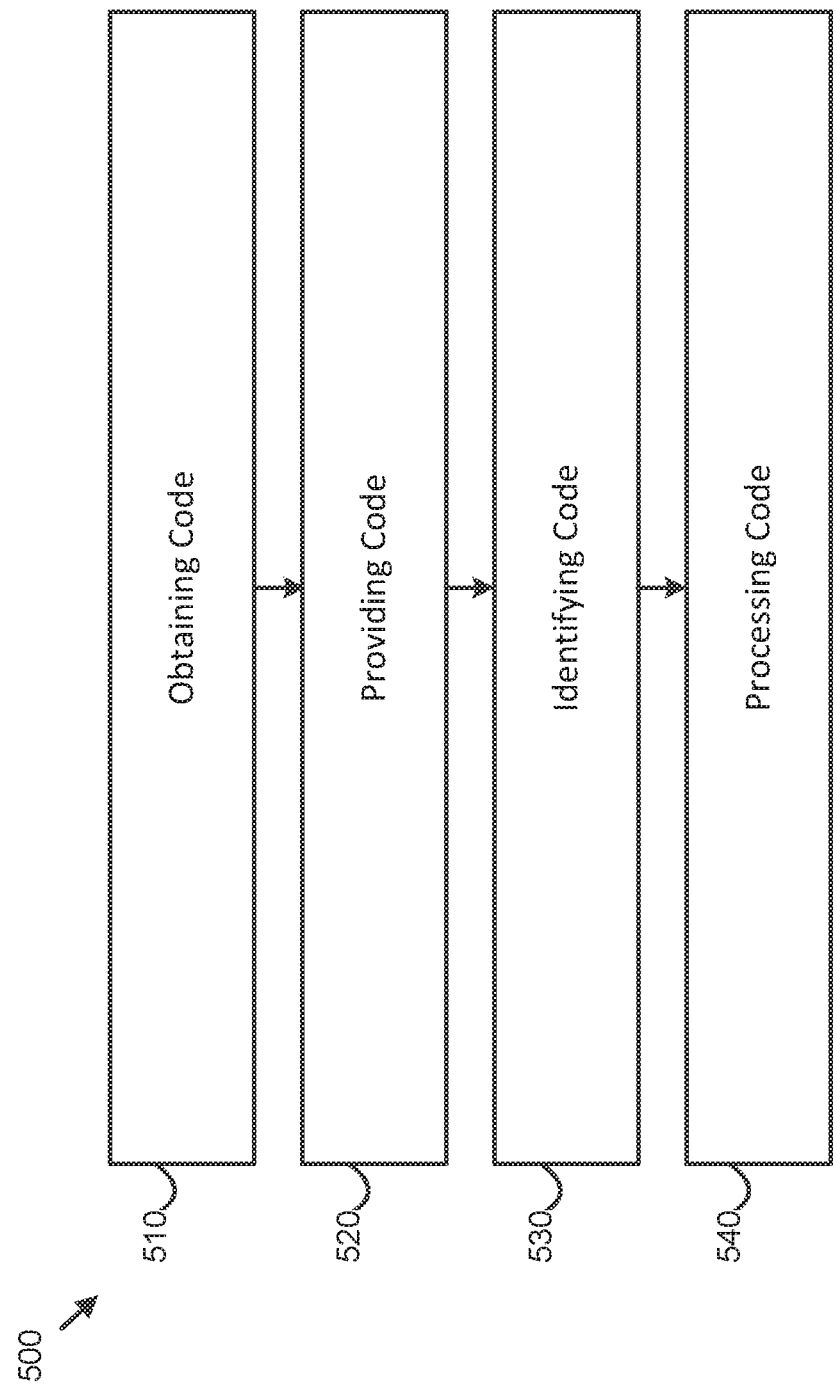
FIG. 5 is a block diagram of an apparatus for processing media content in MPEG NBMP, according to embodiments.

FIG. 5 is a diagram of an apparatus 500 for processing media content in MPEG NBMP, according to embodiments. As shown in FIG. 5, the apparatus 500 includes first obtaining code 510, second obtaining code 520, processing code 530 and third obtaining code 540.

The obtaining code 510 is configured to cause the at least one processor to obtain a plurality of tasks for processing the media content.

The providing code 520 is configured to cause the at least one processor to provide an interface between an NBMP workflow manager and a cloud manager by providing an NBMP Link application program interface (API), which links the plurality of tasks together.

The identifying code 530 is configured to cause the at least one processor to identify an amount of network resources to be used for processing the media content, by using the NBMP Link API.

The processing code 540 is configured to cause the at least one processor to process the media content in accordance with the identified amount of network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing media content in Moving Picture Experts Group (MPEG) Network Based Media Processing (NBMP), the method being performed by at least one processor, and the method comprising:
    obtaining a plurality of tasks for processing the media content;
    providing an NBMP Link application program interface (API) between an NBMP workflow manager and a cloud manager to link the plurality of tasks together;
    identifying an amount of network resources to be used for processing the media content, by using the NBMP Link API; and
    processing the media content in accordance with the identified amount of network resources,
    wherein the identifying the amount of network resources comprises monitoring a status of the NBMP Link API during a media session, and
    wherein the NBMP workflow manager is configured to identify whether a function is supported and provide an authorized uniform resource locator (URL) to the cloud manager to download implementation of the function when the function is not supported.

2. The method of claim 1, wherein the identifying the amount of network resources to be used for processing the media content comprises monitoring a communication between the linked plurality of tasks by extending NBMP Quality of Service (QoS) requirements according to at least one parameter.

3. The method of claim 2, wherein the at least one parameter comprises at least one from among minDelay, maxDelay, minThroughput, maxThroughput, and averagingWindow.

4. The method of claim 1, wherein the identifying the amount of network resources comprises receiving a report from the NBMP Link API.

5. The method of claim 1, further comprising a function discovery API between the NBMP workflow manager and the cloud manager.

6. The method of claim 5, wherein the function discovery API comprises discovering pre-loaded functions to use for processing the media content.

7. An apparatus for processing media content in Moving Picture Experts Group (MPEG) Network Based Media Processing (NBMP), the apparatus comprising:
    at least one memory configured to store program code; and
    at least one processor configured to read the program code and operate as instructed by the program code, the program code comprising:
        obtaining code configured to cause the at least one processor to obtain a plurality of tasks for processing the media content;
        providing code configured to cause the at least one processor to provide an NBMP Link application program interface (API) between an NBMP workflow manager and a cloud manager to link the plurality of tasks together;
        identifying code configured to cause the at least one processor to identify an amount of network resources to be used for processing the media content, by using the NBMP Link API; and processing code configured to cause the at least one processor to process the media content in accordance with the identified amount of network resources,
wherein the identifying code is further configured to cause the at least one processor to monitor a status of the NBMP Link API during a media session, and
wherein the NBMP workflow manager is configured to identify whether a function is supported and provide an authorized uniform resource locator (URL) to the cloud manager to download implementation of the function when the function is not supported.

8. The apparatus of claim 7, wherein the identifying code is further configured to cause the at least one processor to monitor a communication between the linked plurality of tasks by extending NBMP Quality of Service (QoS) requirements according to at least one parameter.

9. The apparatus of claim 8, wherein the at least one parameter comprises at least one from among minDelay, maxDelay, minThroughput, maxThroughput, and averagingWindow.

10. The apparatus of claim 7, wherein the identifying code is further configured to cause the at least one processor to receive a report from the NBMP Link API.

11. The apparatus of claim 7, further comprising a function discovery API between the NBMP workflow manager and the cloud manager.

12. The apparatus of claim 11, wherein the function discovery API comprises discovering pre-loaded functions to use for processing the media content.

13. A non-transitory computer-readable medium storing instructions that, when executed by at least one processor of an apparatus for processing media content in Moving Picture Experts Group (MPEG) Network Based Media Processing (NBMP), cause the at least one processor to:
obtain a plurality of tasks for processing the media content;
provide an interface between an NBMP workflow manager and a cloud manager by providing an NBMP Link application program interface (API), which links the plurality of tasks together;
identify an amount of network resources to be used for processing the media content, by using the NBMP Link API; and
process the media content in accordance with the identified amount of network resources,
wherein the identifying the amount of network resources comprises monitoring a status of the NBMP Link API during a media session, and
wherein the NBMP workflow manager is configured to identify whether a function is supported and provide an authorized uniform resource locator (URL) to the cloud manager to download implementation of the function when the function is not supported.

14. The non-transitory computer-readable medium of claim 13, wherein the identifying the amount of network resources to be used for processing the media content comprises monitoring a communication between the linked plurality of tasks by extending NBMP Quality of Service (QoS) requirements according to at least one parameter.

15. The non-transitory computer-readable medium of claim 14, wherein the at least one parameter comprises at least one from among minDelay, maxDelay, minThroughput, maxThroughput, and averaging Window.

16. The non-transitory computer-readable medium of claim 13, wherein the identifying the amount of network resources comprises receiving a report from the NBMP Link API.

17. The non-transitory computer-readable medium of claim 13, further comprising a function discovery API between the NBMP workflow manager and the cloud manager.

* * * * *